United States Patent [19]

Takahashi

[11] Patent Number: 4,685,209
[45] Date of Patent: Aug. 11, 1987

[54] FILM PICKER FOR FILM CARTRIDGE
[75] Inventor: Hiroshi Takahashi, Atami, Japan
[73] Assignee: Nihon Jumbo Kabushiki Kaisha, Atami, Japan
[21] Appl. No.: 810,761
[22] Filed: Dec. 19, 1985
[51] Int. Cl.⁴ ............................................. B23P 19/04
[52] U.S. Cl. ...................................... 29/806; 29/270
[58] Field of Search ................... 29/270, 806; 81/1 R; 354/275

[56] References Cited
U.S. PATENT DOCUMENTS
4,335,948 6/1982 Cocco ................................. 354/275

FOREIGN PATENT DOCUMENTS
2709638 9/1978 Fed. Rep. of Germany ........ 29/806
56-21146 5/1981 Japan .

Primary Examiner—Timothy V. Eley
Attorney, Agent, or Firm—Parkhurst & Oliff

[57] ABSTRACT

A film picker for a film cartridge comprising a flat body having at its end a cartridge fixture adapted to be pressed against an outer surface at an inlet of the film cartridge, and a thin elastic guide plate, extracting plate and film pressing plate extending from the end of the body in an overlapping manner with one another. The guide plate and the extracting plate have a width which is substantially the same as that of the film rewound within the cartridge, are individually movably held relative to the body and are coupled with associated actuation buttons. The film pressing plate is fixedly secured to the body with its end being curved in a direction away from the film fixture. Thus, a simple and easy extraction of the film may be ensured without any damage to the picker plate.

8 Claims, 9 Drawing Figures

FILM PICKER FOR FILM CARTRIDGE

FIELD OF THE INVENTION AND RELATED ART STATEMENT

The present invention relates to a film picker for readily and simply picking up or extracting a film end or leader of a film rewound within a cartridge or patrone in a bright place without any darkroom or changing darkbag.

Hitherto, a tool for picking a film leader of a film rewound within a cartridge in a bright place has been developed. One example thereof is disclosed in Japanese Patent Examined Publication No. 21146/81, which is assigned to the present assignee. According to the disclosure of that patent, a picker plate has a claw for engagement with perforation of the film upon being inserted into the film cartridge, and the picker plate is introduced inside of the film leader within the cartridge so that the claw is engaged with the perforation of the film for extracting the film leader. This picker is useful for readily picking up the film by a simple operation but often suffers from failure in picking the film. In particular, it would be difficult to extract the film from a cartridge of such type that the rewound film has a cut film leader or is short in length or that an exit of the cartridge is not exactly directed in a tangential direction to its circumferential surface but is slightly slanted to the tangential surface. Also, the claw of the picker plate would be liable to be damaged during use of the picker so that a service life thereof would be reduced disadvantageously.

OBJECT AND SUMMARY OF THE INVENTION

In order to overcome the above-noted defects, an object of the present invention is to provide a film picker which is capable of extracting a film leader or end of a film rewound in the cartridge without failure and which has a longer service life.

As a result of studies of causes of a film extracting failure with a conventional film picker, it is found that, when a picker plate is introduced inside of the film leader of the film rewound within the cartridge, the film escapes while being pressed by the picker plate end so that a good insertion of the picker plate is impossible. For this reason, the film extracting failure is caused. Thus, it is found that a good insertion of the picker plate may be carried out by pressing the film rewound within the cartridge. Also, even if the claw for engaging with the perforation of the film is dispensed with, if a width of the picker or extracting plate is substantially the same as a width of the film, then the extracting plate introduced inside of the film leader of the film within the cartridge is curved along the inner circumferential surface of the cartridge and is pressed against the guide plate, which is located outside of the extracting plate, due to its own resiliency so that the film leader is firmly clamped between the guide plate and the extracting plate. Accordingly, the film leader may be extracted from the cartridge.

According to the present invention, a film picker for a film cartridge comprises a flat body having at its end a cartridge fixture adapted to be pressed against an outer surface at an inlet of the film cartridge, and a thin elastic guide plate, extracting plate and film pressing plate extending from the end of the body in an overlapping manner with one another, wherein the guide plate and the extracting plate have a width which is substantially the same as that of the film rewound within the cartridge, are individually movably held relative to the body and are coupled with associated actuation buttons, and the film pressing plate is fixedly secured to the body with its end being curved opposite to the film fixture.

DETAILED DESCRIPTION OF THE PREFERRED EMBODIMENTS

Figure 1:
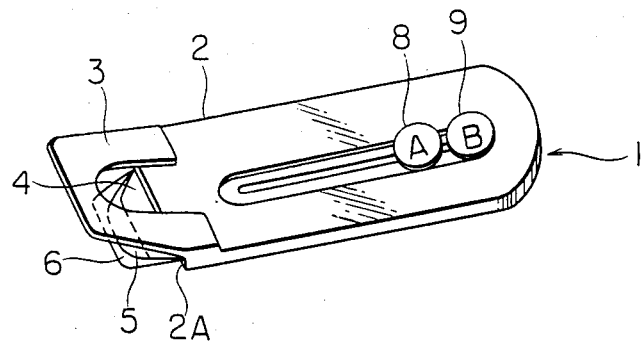
FIG. 1 is a perspective view showing a film picker according to the present invention.

The present invention will now be described with reference to the accompanying drawings.

Referring now to FIGS. 1 to 4a, a film picker 1 according to the present invention comprises a flat body 2 which has a shape such that the film picker may readily be gripped by the operator's hand. A film cartridge fixture 3 to be pushed against an upper outer surface of an exit of a film cartridge or patrone is integrally formed to extend from one end 2A (left and in the drawings) of the body 2. Further from the end 2A, there are extended three thin elastic plates, in overlapping relation one on another, that is, a guide plate 4, an extracting plate 5 and a film pressing plate 6. The guide plate 4 and the extracting plate 5 are held to be individually movable relative to the body 2 and are displaceable from a retracted position shown in FIG. 1 to an extended position shown in FIG. 4. A longitudinally extending slot 7 is formed in the body 2 and two buttons 8 and 9 are movably held therealong. The front button 8 is coupled to the uppermost guide plate 4 so as to be moved together with the latter and constitutes a guide plate sliding button for actuating the guide plate 4. The rear button 9 is coupled to the intermediate extracting plate 5 so as to be moved together with the latter and constitutes an extracting plate sliding button for actuating the extracting plate 5. Thus, it is possible to advance the guide plate sliding button 8 from the position shown in FIG. 2, extend only the guide plate 4 to the position shown in FIG. 4 and then advance the extracting plate sliding button 9 to extend the extracting plate 5 to the position shown in FIG. 4.

A slot (not shown) is formed in the extracting plate 5 for the movement of the guide plate sliding button 8. Also, a slot (not shown) is formed in the film pressing plate 6 for the movement of the guide plate sliding button 8 and the extracting plate sliding button 9. Thus, the buttons 8 and 9 may be moved along the groove 7 of the body 2 without any hindrance. In order to prevent the extracting plate 5 and the button 9 from moving together with the guide plate 4 when the button 8 is moved leftward from the position shown in FIG. 3 to extend the guide plate 4, a shallow recess 7a into which a head of the button 9 is slightly inserted is formed in an upper surface at the right end position of the groove 7 of the body 2, and on the other hand, a disc 9a made of elastic material such as sponge is interposed between an undersurface of the body 2 and a lower head of the button 9. Therefore, the elastic disc causes the button 9 to be normally pressed downwardly so that the upper head of the button 9 is held in the recess in the stationary position. However, if the button 9 is manually pushed upwardly, the button 9 may be moved as desired.

Figure 4:
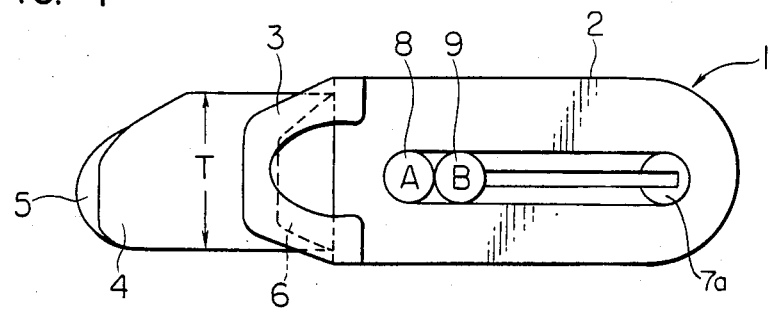
FIG. 4 is a plan view of the film picker shown in FIG. 1 but illustrates a state that the guide plate and extracting plate are in an extended position.
Figure 4A:
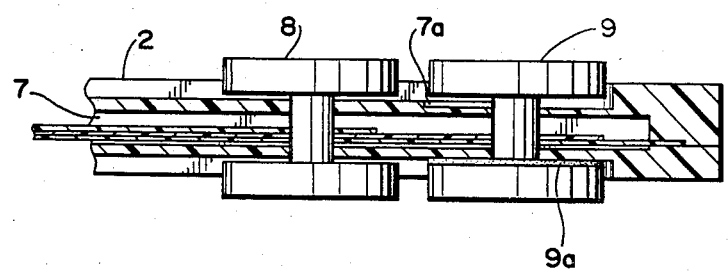
FIG. 4a is a partial cross-section of the film picker according to the present invention taken along the line IVa—IVa of FIG. 2.

As shown in FIG. 4, a proximal width T of the guide plate 4 and the extracting plate 5 is substantially the same as a width of a film in the cartridge, but distal ends of the plates 4 and 5 are tapered for easy insertion into the film cartridge and inside the film leader (described in detail later). Lengths of the guide plate 4 and the extracting plate 5 are selected so that the guide plate 4 and the extracting plate 5 may be inserted into the film cartridge up to two thirds of an inner circumference of the cartridge.

Figure 3:
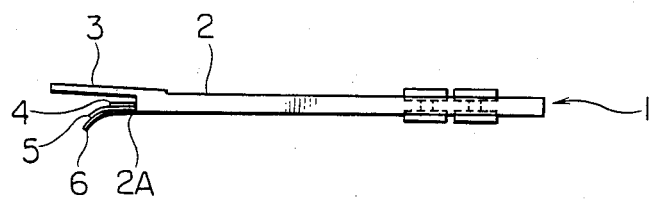
FIG. 3 is a side elevational view of the film picker shown in FIG. 1.
Figure 6:
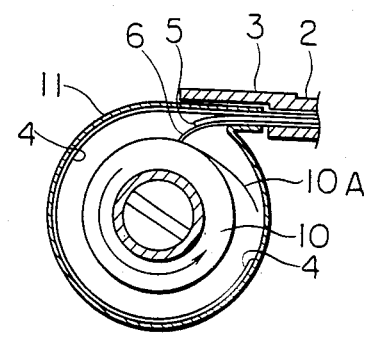

The film pressing plate 6 is fixed to the body 2 and its free end is curved in a direction away from cartridge fixture 3 and hence downwardly in FIG. 3. A length and a curvature of the film pressing plate 6 are selected so that, when the film pressing plate 6 is inserted into the cartridge as shown in FIG. 6, its free end may press the circumferential surface of the film 10 radially inwardly.

The end portions of the guide plate 4 and the extracting plate 5 are also curved for easy insertion through the exit of the cartridge together with the film pressing plate 6. The guide plate 4, extracting plate 5 and film pressing plate 6 may be formed of elastic plastic and may preferably be made of material having no light permeability nor reflectivity in order not to introduce light to the film within the cartridge during the use of the film picker. For this reason, it is preferable to make these components from plastic colored in black in a molten state. The body 2 and buttons 8 and 9 may readily be molded of plastic.

Figure 2:
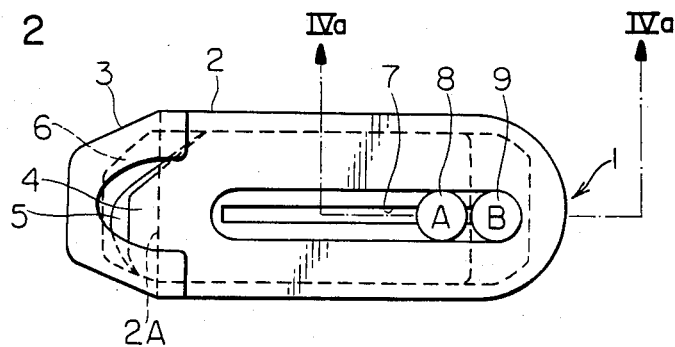
FIG. 2 is a plan view of the film picker shown in FIG. 1.
Figure 5:
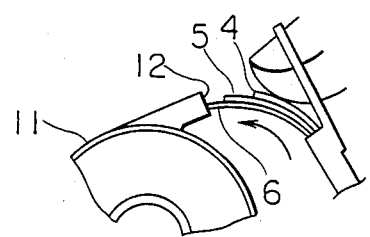
FIGS. 5 through 8 are views showing the order of use of the film picker according to the invention.

In operation, first of all, the buttons 8 and 9 are retracted back to the position shown in FIG. 2. Under such a condition, the three components, that is, the guide plate 4, extracting plate 5 and film pressing plate 6 are inserted together into the exit 12 of the cartridge or patrone 11 (see FIG. 5). Then, as shown in FIG. 6, the cartridge fixture 3 is pressed against the upper outer surface at the exit of the cartridge. In this state, the film pressing plate 6 presses the circumferential surface of the film 10. Subsequently, the guide plate sliding button 8 is slid to the extreme left end shown in FIG. 2 so that the guide plate 4 is deeply inserted into the cartridge 11. At this time, the guide plate 4 is advanced outside of the rolled film 10 along the inner wall of the cartridge. Next, a winding core of the film of the cartridge is slowly turned in a film winding direction (counterclockwise in FIG. 6). When the rotation causes the leader 10A of the film 10 to pass under the end of the film pressing plate 6, the film leader 10A is released from the restraint of the film pressing plate 6 and the resiliency of the film causes the film leader to abut against the guide plate 4 to generate a clicking sound. According to this clicking sound, the rotation of the winding core of the film is stopped. At this time, the film leader 10A is located to confront with the exit of the cartridge as shown in FIG. 7.

Figure 7:
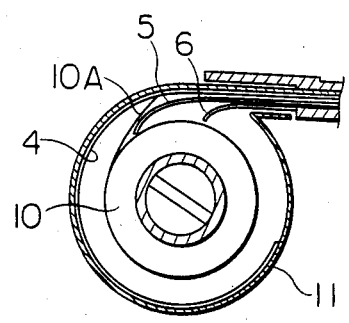
Figure 8:
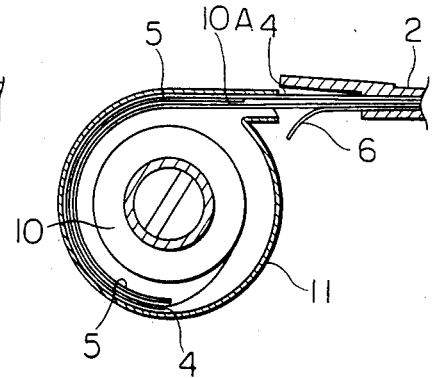

Subsequently, when the extracting plate sliding button 9 is pushed upwardly in FIG. 3 and is moved leftwardly to deeply insert the extracting plate 5 into the cartridge, the extracting plate 5 is introduced inside of the film leader 10A as shown in FIG. 7. At this time, since the outer circumferential surface of the film 10 is pressed by the film pressing plate 6, the film leader 10A cannot escape, thus ensuring the insertion of the extracting plate 5 just inside of the film leader 10A. Thus, the film leader 10A is clamped between the guide plate 4 and the extracting plate 5. Finally, when the body 2 is gently removed from the exit of the cartridge, the film leader is clamped between the guide plate 4 and the extracting plate 5 as shown in FIG. 8 and is extracted through the cartridge exit.

As described above, the film picker according to the present invention includes the film pressing plate 6 for pressing the circumferential surface of the film within the cartridge to thereby prevent the escape of the film. Therefore, action to introduce the extracting plate 5 inside of the film leader is insured and this makes it possible to readily pick up the film, leader in the case of cut film leader, or a short film, or in the case where the exit of the cartridge is not exactly directed in a tangential direction to the circumferential surface of the cartridge but is slightly slanted with respect to the tangential plane thereof. Furthermore, according to the invention, since a claw for engagement with perforation of the film is not provided on the extracting plate 5 (corresponding to a picker plate of the conventional tool), a service life of the film picker is considerably prolonged. Also, according to the present invention, for the purpose of detecting a film leader end position, the film core is turned and a clicking sound is generated when the film leader end is released from the film pressing plate 6 pressing the circumferential surface of the film to abut against the guide plate 4. This clicking sound is larger than a sound which is generated in the conventional tool when the film leader has passed through the picker plate and abuts against the guide plate. Therefore, according to the invention, the clicking sound may readily be detected.

I claim:

1. A film picker for a film cartridge, comprising a flat body having at an end a cartridge fixture adapted to be pressed against an outer surface of the film cartridge at an outlet of the film cartridge, and a thin elastic guide plate, extracting plate and film pressing plate extending from said end of the body in an overlapping manner with one another, wherein said guide plate and said extracting plate have a width which is substantially the same as that of film rewound within the cartridge, are individually movably held relative to the body and are coupled with associated actuation buttons, and said film pressing plate is fixedly secured to the body with an end being curved in a direction away from said cartridge fixture.

2. The film picker according to claim 1, further comprising means for holding said extracting plate at a predetermined position in the body.

3. The film picker according to claim 2, wherein said holding means comprises means for biasing in a predetermined direction the actuation button associated with said extracting plate.

4. The film picker according to claim 3, wherein said biasing means comprises a sponge plastic.

5. The film picker according to claim 1, wherein said guide plate, extracting plate and film pressing plate are made of plastic having a color of black.

6. The film picker according to claim 1, wherein said film pressing plate comprises means for detecting a leader position of said film by generating a clicking sound.

7. The film picker according to claim 1, wherein said cartridge fixture, guide plate, extracting plate and film pressing plate are arranged in an overlapping fashion in that order.

8. The picker plate according to claim 1, wherein said body has a slot which permits movement of said guide plate and extracting plate by said actuation buttons.

* * * * *